(12) United States Patent
Valente

(10) Patent No.: US 9,346,354 B2
(45) Date of Patent: May 24, 2016

(54) DISCONNECTING DRIVELINE COMPONENT

(71) Applicant: American Axle & Manufacturing, Inc., Detroit, MI (US)

(72) Inventor: Paul J. Valente, Berkley, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 95 days.

(21) Appl. No.: 14/194,870

(22) Filed: Mar. 3, 2014

(65) Prior Publication Data

US 2015/0247562 A1 Sep. 3, 2015

(51) Int. Cl.
| | |
|---|---|
| *F16H 48/22* | (2006.01) |
| *B60K 23/08* | (2006.01) |
| *B60K 17/35* | (2006.01) |
| *F16H 48/08* | (2006.01) |
| *F16H 48/34* | (2012.01) |

(52) U.S. Cl.
CPC ............. *B60K 23/0808* (2013.01); *B60K 17/35* (2013.01); *B60K 2023/0833* (2013.01); *B60K 2023/0858* (2013.01); *F16H 48/08* (2013.01); *F16H 48/22* (2013.01); *F16H 48/34* (2013.01)

(58) Field of Classification Search
CPC .. F16H 48/05; F16H 2048/04; F16H 37/0826
USPC .......................................................... 475/222
See application file for complete search history.

(56) References Cited

U.S. PATENT DOCUMENTS

| | | | |
|---|---|---|---|
| 6,012,560 A * | 1/2000 | Kuroda et al. | 192/35 |
| 6,533,090 B2 | 3/2003 | Osborn et al. | |
| 6,592,487 B2 | 7/2003 | Gassmann | |
| 6,719,662 B2 | 4/2004 | Forrest et al. | |
| 6,827,663 B2 | 12/2004 | Tucker-Peake | |
| 2003/0186772 A1* | 10/2003 | Grogg et al. | 475/198 |
| 2006/0046890 A1* | 3/2006 | Aikawa | 475/231 |
| 2010/0285917 A1* | 11/2010 | Rahm | F16H 48/08 475/220 |

* cited by examiner

*Primary Examiner* — Robert Hodge
*Assistant Examiner* — Ryan Dodd
(74) *Attorney, Agent, or Firm* — Harness, Dickey & Pierce, P.L.C.

(57) ABSTRACT

A driveline component that includes an input member, a differential case, a differential gearset housed in the differential case, a first clutch and a second clutch. The first clutch is configured to selectively transmit rotary power between the input member and the differential case. The second clutch is configured to selectively transmit rotary power between the input member and the differential case. The first clutch has a first engagement time and that is less than a second engagement time of the second clutch.

20 Claims, 3 Drawing Sheets

DISCONNECTING DRIVELINE COMPONENT

FIELD

The present disclosure relates to a disconnecting driveline component.

BACKGROUND

This section provides background information related to the present disclosure which is not necessarily prior art.

Disconnecting all-wheel drive vehicles are known in the art from various issued patents, such as U.S. Pat. No. 8,042,642 issued Oct. 25, 2011. Such disconnecting all-wheel drive vehicles employ a first disconnecting element in the front or primary driveline and a second disconnecting element in the rear or secondary driveline. It can be important in some instances that one or both of the first and second disconnecting elements exhibit a relatively low drag torque when not engaged (i.e., when not being used to actively transmit rotary power). If one or both of the first and second disconnecting elements includes a multi-plate clutch pack, low drag is typically at least partially achieved by moving the clutch plates a sufficiently far distance from one another. In this regard, if the clutch plates are not separated by a sufficient distance, the disconnecting element can have a drag torque that can rival the drag torque of the (other) driveline components that are to be "disconnected".

As the disconnecting drivelines must typically be capable of transmitting relatively high torque, the clutch packs employed in such devices generally include a relatively high number of clutch plates. Due to the need for a relatively high normal force to transmit high torque through such clutch packs, one common approach is to employ a hydraulically-powered actuator, which is fed hydraulic fluid via a high pressure pump, for applying the normal force. In order to sufficiently space or separate a large quantity of clutch plates, the actuator that applies the normal force to the clutch pack must have a relatively long travel. Due to the magnitude of the normal force and the relatively long length of travel, such friction clutches have a relatively long engagement time (i.e., a length of time between the point in time at which the friction clutch begins to engage and the point in time at which the friction clutch is fully engaged).

In view of the above remarks, an improved driveline component that is capable of being disconnected is needed in the art.

SUMMARY

This section provides a general summary of the disclosure, and is not a comprehensive disclosure of its full scope or all of its features.

In one form, the present teachings provide a driveline component that includes an input member, a differential case, a differential gearset housed in the differential case, a first clutch and a second clutch. The differential gearset has a pair of differential output members. The first clutch is configured to selectively transmit rotary power between the input member and the differential case. The second clutch is configured to selectively transmit rotary power between the input member and the differential case. The first clutch has a first engagement time and the second clutch has a second engagement time that is greater than the first engagement time.

In a further form, the present teachings provide a driveline component that includes an input member, a differential case, a differential gearset housed in the differential case, a first clutch and a second clutch. The differential gearset has a pair of differential output members. The first clutch is configured to selectively transmit rotary power between the input member and the differential case. The second clutch is configured to selectively transmit rotary power between the input member and the differential case. When the differential output members are rotated at a first rate and the input member is rotated at or below a second rate, the first clutch has a first drag torque that is greater than a second drag torque of the second clutch.

In still another form, the present teachings provide a method that includes: providing a driveline component with an input member, a differential case, a differential gearset housed in the differential case, a first clutch and a second clutch; operating the driveline component in a disconnected mode in which rotary power is not transmitted between the input member and the differential case; engaging the first clutch to transmit rotary power between the input member and the differential case, the first clutch providing a first torque path between the input member and the differential case and having a first torque capacity; and engaging the second clutch to provide a second torque path between the input member and the differential case, the second clutch having a second torque capacity. The second clutch is fully engaged at a time after the first clutch is engaged. The second torque capacity is greater than the first torque capacity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
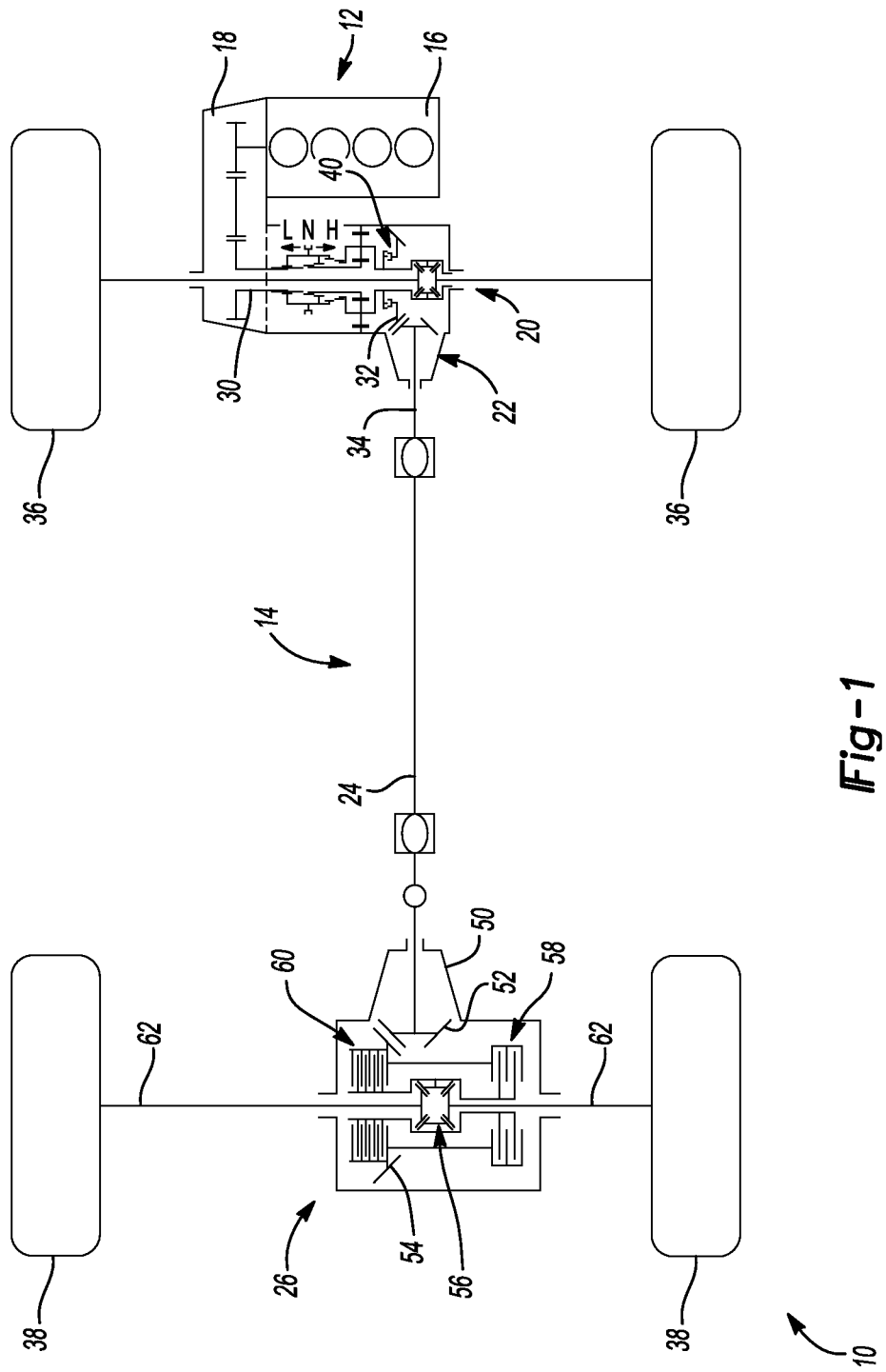
FIG. 1 is a schematic of a motor vehicle having an all-wheel drive system with a disconnecting driveline component constructed in accordance with the teachings of the present disclosure.

With reference to FIG. 1 of the drawings, an exemplary vehicle having a power transmitting component constructed in accordance with the teachings of the present disclosure is generally indicated by reference numeral 10. The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14. The transmission 18 can have a plurality of automatically or manually-selected gear ratios. The drive train 14 in the particular example provided is of an all-wheel drive configuration, but those of skill in the art will appreciate that the teachings of the present disclosure are applicable to other drive train configurations, including four-wheel drive configurations, rear-wheel drive configurations, and front-wheel drive configurations.

The drive train 14 can include a front axle assembly 20, a power take-off unit (PTU) 22, a prop shaft 24 and a disconnecting driveline component 26. In the particular example provided, the disconnecting driveline component is a rear axle assembly, but it will be appreciated that the teachings of the present disclosure have application to other driveline components. An output of the transmission 18 can be coupled to an input of the front axle assembly 20 to drive an input member 30 of the front axle assembly 20. The front axle assembly 20 and the PTU 22 are described in more detail in commonly-assigned U.S. application Ser. No. 13/785,425, the disclosure of which is incorporated by reference as if fully set forth in detail herein. Briefly, the PTU 22 can have a PTU input member 32, which can receive rotary power from the input member 30 of the front axle assembly 20, and a PTU output member 34 that can transmit rotary power to the prop shaft 24. The prop shaft 24 can couple the PTU output member 34 to the rear axle assembly 26 such that rotary power output by the PTU 22 is received by the rear axle assembly 26. The front axle assembly 20 and the rear axle assembly 26 could be driven on a full-time basis to drive front and rear vehicle wheels 36 and 38, respectively. The drive train 14 can include one or more clutches to interrupt the transmission of rotary power through a part of the drive train 14. In the example provided, the drive train 14 include a first clutch 40, which can be configured to interrupt the transmission of rotary power into or through the PTU 22, and a plurality of clutches are incorporated into the rear axle assembly 26 as will be discussed in more detail below.

Figure 2:
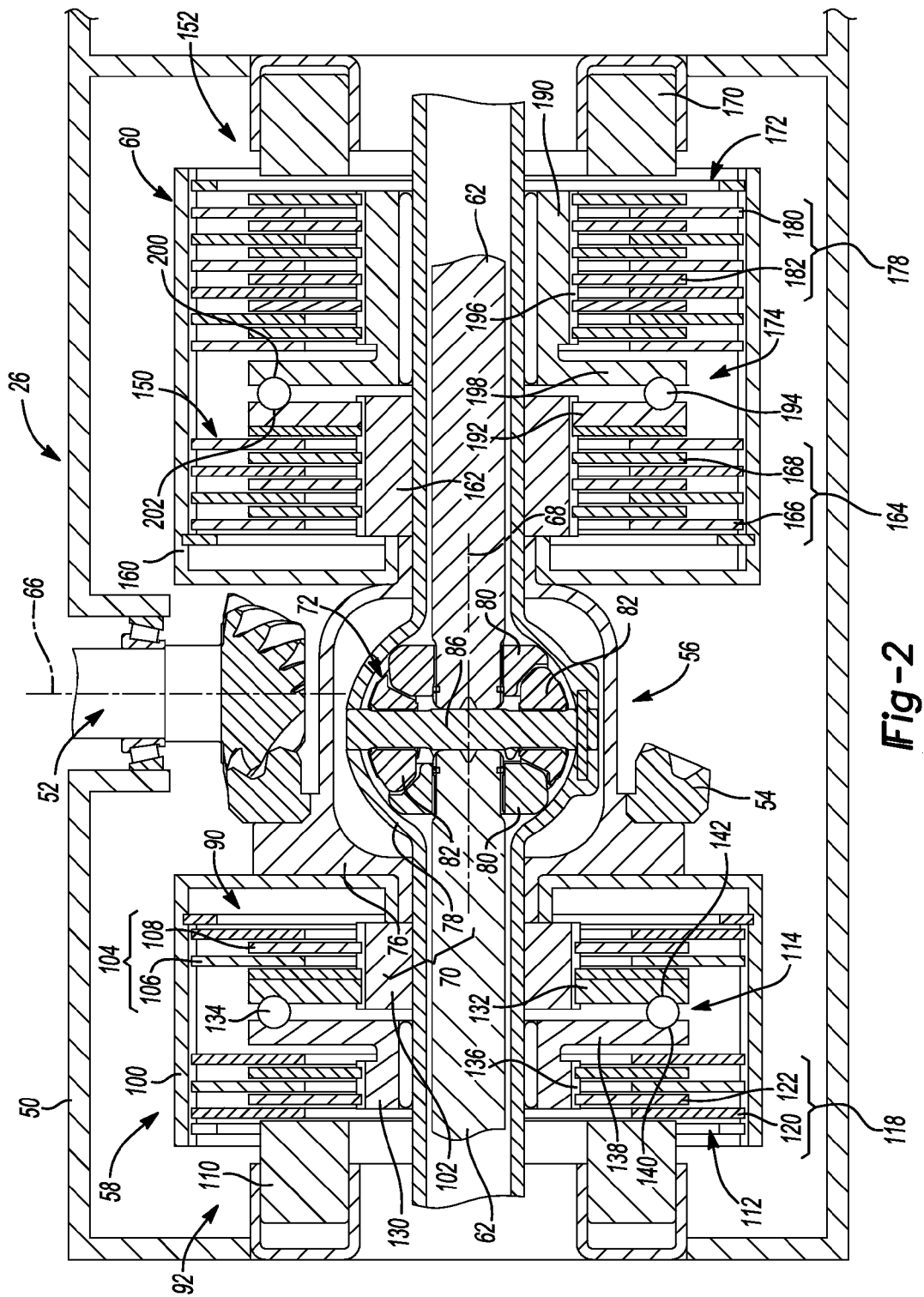
FIG. 2 is a longitudinal section view of a portion of the disconnecting driveline component of FIG. 1.

With reference to FIG. 2, the rear axle assembly 26 can include a housing 50, an input pinion 52, a ring gear 54, a differential assembly 56, a first clutch mechanism 58, a second clutch mechanism 60, and a pair of axle shafts 62. The input pinion 52 can be conventionally housed in the housing 50 for rotation about an input pinion axis 66. The input pinion 52 can be coupled to the prop shaft 24 (FIG. 1) for rotation therewith. The ring gear 54 can be mounted in the housing 50 for rotation about a differential axis 68 that can be transverse, e.g., perpendicular, to the input pinion axis 66. The ring gear 54 can be meshingly engaged with the input pinion 52. The differential assembly 56 can be any means known in the art for transmitting rotary power in a torque path between the ring gear 54 and the axle shafts 62. In the particular example provided, the differential assembly 56 includes a differential case 70 and a differential gearset 72. The differential case 70 can comprise a first case member 76, which can be fixedly coupled to the ring gear 54, and a second case member 78. In the particular example provided, the first case member 76 is mounted concentrically about the second case member 78. The differential gearset 72 can be mounted to the second case member 78 of the differential case 70 in a manner that permits rotary power to be transmitted therebetween. For example, the differential gearset 72 can comprise a pair of side gears 80 and a plurality of differential pinions 82 that are meshingly engaged with the side gears 80. In the example provided, the side gears 80, which are rotatably mounted on a cross-pin 86 that is fixedly coupled to the second case member 78, and the differential pinions 82 are bevel gears, with each of the differential pinions 82 being meshingly engaged with both of the side gears 80. It will be appreciated, however, that other types of differential gearsets could be employed (e.g., helical gearsets in which pairs of the differential pinions have helical teeth that are meshed together and each one of the pair of differential pinions is meshed with the helical teeth of a corresponding one of the side gears). Each of the axle shafts 62 can be coupled to one of the side gears 80 for common rotation.

Each of the first and second clutch mechanisms 58 and 60 can be employed to selectively couple the first and second case members 76 and 78 to one another for common rotation. The first and second clutch mechanisms 58 and 60 can vary in one or more ways, such as in their drag torque (i.e., the amount of torque transmitted through the clutch when the clutch is in a fully/completely disengaged operational state and the input of the clutch is rotated relative to the output of the clutch in a predetermined rotational direction and at or below a predetermined rate), their torque capacity (i.e., the amount of torque that can be transmitted from the input of the clutch to the output of the clutch in a predetermined rotational direction and at a predetermined rotational speed) and/or their engagement time (i.e., the duration of time needed to change the operational state of the clutch from a completely disengaged state, in which the only torque transmitted by the clutch is its drag torque, to a fully engaged state that is capable of transmitting the full torque capacity of the clutch). For example, a) the first clutch mechanism 58 can have a drag torque that can be less than the drag torque of the second clutch mechanism 60, and/or b) the first clutch mechanism 58 can have a first torque capacity that can be less than a second torque capacity of the second clutch mechanism 60, and/or c) the first clutch mechanism 58 can have a first engagement time, the second clutch mechanism 60 can have a second engagement time, and the second engagement time can be greater than the first engagement time.

The first clutch mechanism 58 can comprise a first clutch 90 and a first clutch actuator 92. The first clutch 90 can have a first input member 100, a first output member 102, and a first set of clutch plates 104 that can include a plurality of first plate members 106 and a plurality of second plate members 108. The first input member 100 can be coupled to the first case member 76 for common rotation. The first output member 102 can be coupled to the second case member 78 for common rotation. The first plate members 106 can be axially slidably but non-rotatably mounted to the first input member 100. The second plate members 108 can be interleaved with the first plate members 106 and can be axially slidably but non-rotatably mounted to the first output member 102.

The first clutch actuator 92 can comprise a first ball-ramp actuator that can be constructed in a manner that is well known in the art. In brief, the first ball-ramp actuator can have a first electromagnet 110, a first pilot clutch 112 and a first ball-ramp mechanism 114. The first electromagnet 110 can be fixedly coupled to the housing 50 and can be selectively operated to create a magnetic field for operating the first pilot clutch 112. The first pilot clutch 112 can include a first set of pilot clutch plates 118 having a plurality of first pilot plates 120 and a plurality of second pilot plates 122. The first pilot plates 120 can be axially slidably but non-rotatably coupled to the first input member 100. The second pilot plates 122 can be interleaved with the first pilot plates 120. The first ball-ramp mechanism 114 can include a first ramp plate 130, a second ramp plate 132 and a set of first balls 134. The first ramp plate 130 can be an annular structure that includes a plurality of splines or longitudinally-extending teeth 136, and a plate member 138 having a plurality of grooves 140 formed therein. The second pilot plates 122 can be axially slidably but non-rotatably coupled to the splines 136. The second ramp plate 132 can be an annular structure that can be axially slidably but non-rotatably coupled to the first output member 102 and abutted against the first set of clutch plates 104. The second ramp plate 132 can have a plurality of grooves 142 formed thereon. The first balls 134 can be received in the grooves 140 and 142 between the first and second ramp plates 130 and 132.

The second clutch mechanism 60 can comprise a second clutch 150 and a second clutch actuator 152. The second clutch 150 can have a second input member 160, a second output member 162, and a second set of clutch plates 164 that can include a plurality of third plate members 166 and a plurality of fourth plate members 168. The second input member 160 can be coupled to the first case member 76 for common rotation. The second output member 162 can be coupled to the second case member 78 for common rotation. The third plate members 166 can be axially slidably but non-rotatably mounted to the second input member 160. The fourth plate members 168 can be interleaved with the third plate members 166 and can be axially slidably but non-rotatably mounted to the second output member 162.

The second clutch actuator 152 can comprise a ball-ramp actuator that can be constructed in a manner that is well known in the art. In brief, the ball-ramp actuator can have a second electromagnet 170, a second pilot clutch 172 and a second ball-ramp mechanism 174. The second electromagnet 170 can be fixedly coupled to the housing 50 and can be selectively operated to create a magnetic field for operating the second pilot clutch 172. The second pilot clutch 172 can include a second set of pilot clutch plates 178 having a plurality of third pilot plates 180 and a plurality of fourth pilot plates 182. The third pilot plates 180 can be axially slidably but non-rotatably coupled to the second input member 160. The fourth pilot plates 182 can be interleaved with the third pilot plates 180. The second ball-ramp mechanism 174 can include a third ramp plate 190, a fourth ramp plate 192 and a set of second balls 194. The third ramp plate 190 can be an annular structure that includes a plurality of splines or longitudinally-extending teeth 196, and a plate member 198 having a plurality of grooves 200 formed therein. The fourth pilot plates 182 can be axially slidably but non-rotatably coupled to the splines 196. The fourth ramp plate 192 can be an annular structure that can be axially slidably but non-rotatably coupled to the second output member 162 and abutted against the second set of clutch plates 164. The fourth ramp plate 192 can have a plurality of grooves 202 formed thereon. The second balls 194 can be received in the grooves 200 and 202 between the third and fourth ramp plates 190 and 192.

When rotary power is to be transmitted from the ring gear 54 to the second case member 78, the first electromagnet 110 can be operated to generate a magnetic field that draws the first ramp plate 130 (which acts as an armature) axially toward the first electromagnet 110 such that the first ramp plate 130 applies a normal force to the first set of pilot clutch plates 118, which permits rotary power to be transmitted between the first input member 100 and the first ramp plate 130 (via the first set of pilot clutch plates 118). Rotation of the first ramp plate 130 relative to the second ramp plate 132 causes corresponding axial movement of the second ramp plate 132 away from the first ramp plate 130 that applies a normal force to the first set of clutch plates 104, which permits rotary power to be transmitted between the first input member 100 and the first output member 102 (via the first set of clutch plates 104).

Figure 3:
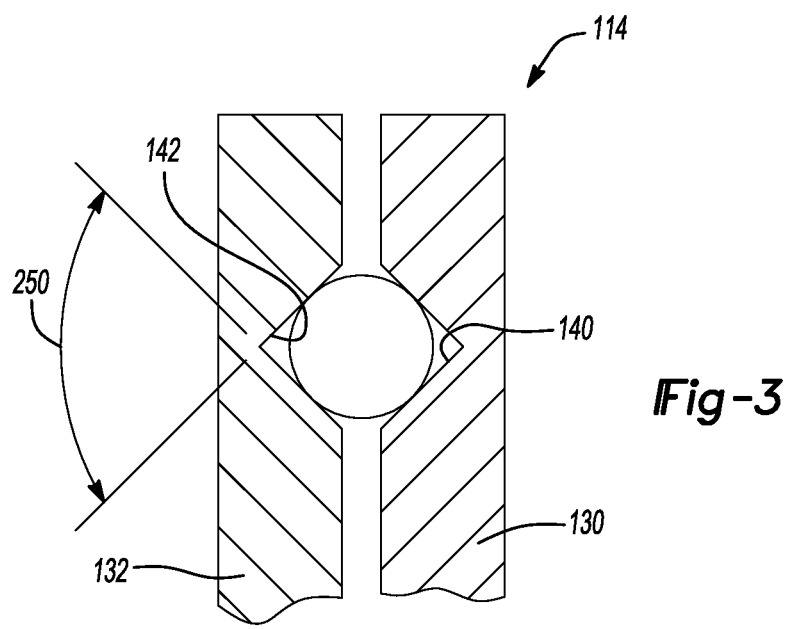
FIG. 3 is a side elevation view of a portion of the disconnecting driveline component of FIG. 1, illustrating a portion of a first clutch in more detail.
Figure 4:
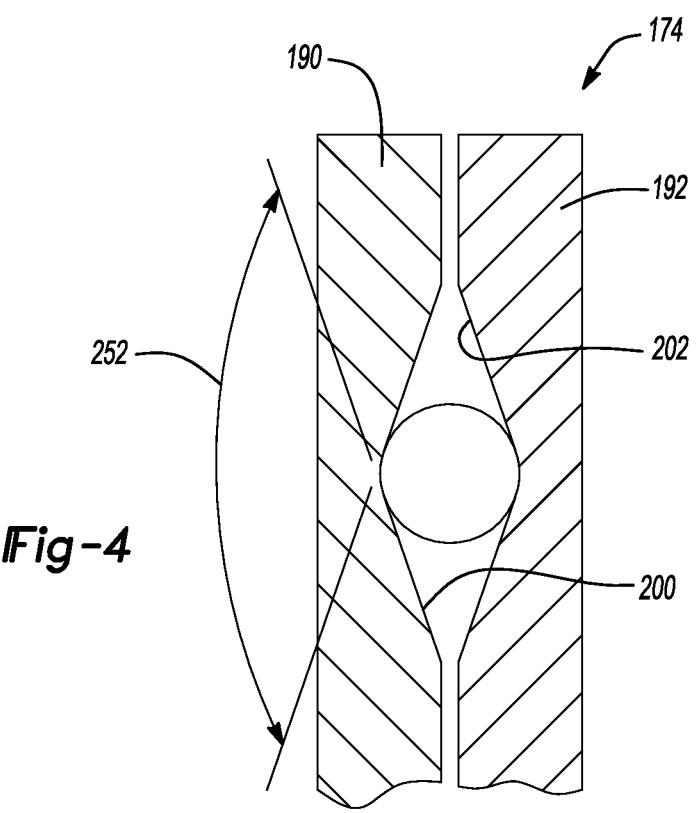
FIG. 4 is a side elevation view of another portion of the disconnecting driveline component of FIG. 1, illustration a portion of a second clutch in more detail.

In the example provided, the grooves 140 and 142 in the first and second ramp plates 130 and 132 are formed with relatively aggressive ramp angles 250 (FIG. 3), whereas the grooves 200 and 202 in the third and fourth ramp plates 190 and 192 are formed with relatively long but shallower angles 252 (FIG. 4). Construction in this manner renders the engagement time of the first clutch mechanism 58 relatively smaller/shorter than the engagement time of the second clutch mechanism 60, as well as to permits the second clutch actuator 152 to develop a relatively higher normal force than the first clutch actuator 92. To take further advantage of the relatively higher normal force produced by the second clutch actuator 152, the quantity of third plate members 166 is more numerous than the quantity of first plate members 106 so that the second clutch mechanism 60 has a larger torque capacity than the torque capacity the first clutch mechanism 58 (and consequently, the second clutch mechanism 60 has a higher drag torque than that of the first clutch mechanism 58).

Accordingly, in situations where it is desirable to transmit more rotary power from the ring gear 54 to the second case member 78 than can be transmitted through the first clutch mechanism 58, the second clutch mechanism 60 may be employed to provide a second, parallel torque path.

The second electromagnet 170 can be operated to generate a magnetic field that draws the third ramp plate 190 (which acts as an armature) axially toward the second electromagnet 170 such that the third ramp plate 190 applies a normal force to the second set of pilot clutch plates 178, which permits rotary power to be transmitted between the second input member 160 and the third ramp plate 190 (via the second set of pilot clutch plates 178). Rotation of the third ramp plate 190 relative to the fourth ramp plate 192 causes corresponding axial movement of the fourth ramp plate 192 away from the third ramp plate 190 that applies a normal force to the second set of clutch plates 164, which permits rotary power to be transmitted between the second input member 160 and the second output member 162 (via the second set of clutch plates 164).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A driveline component comprising:
   an input member;
   a differential case member configured for rotation relative to the input member;
   a pair of differential outputs;
   a differential gearset housed in the differential case member, the differential gearset being configured to receive rotary power from the differential case member and output differential rotary power to the differential outputs;
   a first clutch operable for selectively transmitting rotary power directly between the input member and the differential case member through the first clutch; and
   a second clutch operable for selectively transmitting rotary power directly between the input member and the differential case member through the second clutch;

wherein the first clutch has a first engagement time and wherein the second clutch has a second engagement time that is greater than the first engagement time.

2. The driveline component of claim 1, wherein the first clutch has a first torque capacity that is less than a second torque capacity of the second clutch.

3. The driveline component of claim 1, wherein the first clutch comprises a ball-ramp actuator.

4. The driveline component of claim 3, wherein the ball ramp actuator includes an electromagnet coil that is selectively operable for generating a magnetic field for engaging the first clutch.

5. The driveline component of claim 1, wherein the second clutch comprises a plurality of first clutch plates interleaved with a plurality of second clutch plates.

6. The driveline component of claim 5, wherein the first clutch comprises a plurality of third clutch plates interleaved with a plurality of fourth clutch plates.

7. The driveline component of claim 6, wherein the first clutch plates are greater in number than the third clutch plates.

8. The driveline component of claim 1, wherein the input member has a first output portion and a second output portion, wherein the differential case member has a first input portion and a second input portion, wherein the first clutch is configured to selectively transmit rotary power between the first output portion and the first input portion along a first torque path, wherein the second clutch is configured to selectively transmit rotary power between the second output portion and the second input portion along a second torque path, wherein the first output portion and the first input portion are opposite end points of the first torque path, wherein the second output portion and the second input portion are opposite end points of the second torque path, wherein no portion of the first torque path overlaps a portion of the second torque path.

9. The driveline component of claim 8, wherein the first and second input portions are on opposite axial sides of the differential case member.

10. A driveline component comprising:
an input member;
a differential case member configured for rotation relative to the input member;
a differential gearset housed in the differential case member, the differential gearset having a pair of differential output members and being configured to receive rotary power from the differential case member and output differential rotary power to the differential output members;
a first clutch operable for selectively transmitting rotary power directly between the input member and the differential case member through the first clutch; and
a second clutch operable for selectively transmitting rotary power directly between the input member and the differential case member through the second clutch; and
wherein when the differential output members are rotated at a first rate and the input member is rotated at or below a second rate, the first clutch has a first drag torque that is greater than a second drag torque of the second clutch.

11. The driveline component of claim 10, wherein the first clutch has a first engagement time and wherein the second clutch has a second engagement time that is greater than the first engagement time.

12. The driveline component of claim 10, wherein the first clutch has a first torque capacity that is less than a second torque capacity of the second clutch.

13. The driveline component of claim 10, wherein the first clutch comprises a ball-ramp actuator.

14. The driveline component of claim 13, wherein the ball ramp actuator includes an electromagnet coil that is selectively operable for generating a magnetic field for engaging the first clutch.

15. The driveline component of claim 10, wherein the second clutch comprises a plurality of first clutch plates interleaved with a plurality of second clutch plates.

16. The driveline component of claim 15, wherein the first clutch comprises a plurality of third clutch plates interleaved with a plurality of fourth clutch plates.

17. The driveline component of claim 16, wherein the first clutch plates are greater in number than the third clutch plates.

18. The driveline component of claim 10, wherein the input member has a first output portion and a second output portion, wherein the differential case member has a first input portion and a second input portion, wherein the first clutch is configured to selectively transmit rotary power between the first output portion and the first input portion along a first torque path, wherein the second clutch is configured to selectively transmit rotary power between the second output portion and the second input portion along a second torque path, wherein the first output portion and the first input portion are opposite end points of the first torque path, wherein the second output portion and the second input portion are opposite end points of the second torque path, wherein no portion of the first torque path overlaps a portion of the second torque path.

19. The driveline component of claim 18, wherein the first and second input portions are on opposite axial sides of the differential case member.

20. A method comprising:
providing a driveline component with an input member, a differential case member, a differential gearset housed in the differential case member, a first clutch and a second clutch, the differential gearset being configured to receive rotary power from the differential case member and output differential rotary power to a pair of differential outputs;
operating the driveline component in a disconnected mode in which rotary power is not transmitted between the input member and the differential case member;
engaging the first clutch to transmit rotary power between the input member and the differential case member, the first clutch providing a first torque path directly between the input member and the differential case member and having a first torque capacity; and
engaging the second clutch to provide a second torque path directly between the input member and the differential case member, the second clutch having a second torque capacity;
wherein the second clutch is fully engaged at a time after the first clutch is engaged and wherein the second torque capacity is greater than the first torque capacity.

* * * * *